United States Patent
Brunt, Jr.

(10) Patent No.: US 10,466,456 B2
(45) Date of Patent: Nov. 5, 2019

(54) TRACTRIX-BASED OPTICAL DEVICE FOR USE WITH ILLUMINATION SOURCES IN OPTICAL SYSTEMS

(71) Applicant: LumenFlow Corp., Wyoming, MI (US)

(72) Inventor: Harold W. Brunt, Jr., Grand Rapids, MI (US)

( * ) Notice: Subject to any disclaimer, the term of this patent is extended or adjusted under 35 U.S.C. 154(b) by 0 days.

(21) Appl. No.: 16/198,218

(22) Filed: Nov. 21, 2018

(65) Prior Publication Data

US 2019/0094506 A1    Mar. 28, 2019

Related U.S. Application Data

(63) Continuation of application No. 15/222,023, filed on Jul. 28, 2016, now Pat. No. 10,168,516.

(51) Int. Cl.
*G02B 19/00* (2006.01)
*G02B 27/09* (2006.01)

(52) U.S. Cl.
CPC ......... *G02B 19/00* (2013.01); *G02B 19/0028* (2013.01); *G02B 19/0066* (2013.01); *G02B 27/0927* (2013.01)

(58) Field of Classification Search
CPC ............... G02B 19/00; G02B 19/0028; G02B 19/0066; G02B 27/0927
See application file for complete search history.

(56) References Cited

U.S. PATENT DOCUMENTS

| | | | |
|---|---|---|---|
| 6,547,423 B2 | 4/2003 | Marshall et al. |
| 7,329,029 B2 | 2/2008 | Chaves et al. |
| 7,918,583 B2 | 4/2011 | Chakmakjian et al. |
| 8,093,801 B2 | 1/2012 | Yamada et al. |
| 9,046,241 B2 | 6/2015 | Xi |
| 9,239,141 B1 | 1/2016 | Schertler |
| 9,470,406 B2 | 10/2016 | Catalano |
| 2008/0043466 A1 | 2/2008 | Chakmakjian et al. |
| 2008/0081531 A1 | 4/2008 | Duong et al. |
| 2009/0275157 A1 | 11/2009 | Winberg et al. |
| 2009/0323028 A1 | 11/2009 | Shanley |
| 2012/0140462 A1 | 6/2012 | Pickard |
| 2014/0063836 A1 | 3/2014 | Chiang et al. |
| 2016/0169458 A1 | 6/2016 | Catalano |
| 2016/0381749 A1 | 12/2016 | Catalano |

*Primary Examiner* — Tsion Tumebo
(74) *Attorney, Agent, or Firm* — Warner Norcross + Judd LLP

(57) ABSTRACT

A tractrix-based optical device is provided. The tractrix-based optical device includes a light receiving surface, a light emitting surface, and an intermediate portion of transparent material between the light receiving surface and the light emitting surface. The intermediate portion includes a boundary connective surface that adheres to a tractrix when in cross-section to provide total internal reflection of light propagating from the light receiving surface to the light emitting surface. The tractrix-based optical device can align and correlate light from multiple off-axis light emitting elements, or from an extended source light emitting element, thereby providing a generally uniform output distribution.

15 Claims, 4 Drawing Sheets
(2 of 4 Drawing Sheet(s) Filed in Color)

TRACTRIX-BASED OPTICAL DEVICE FOR USE WITH ILLUMINATION SOURCES IN OPTICAL SYSTEMS

CROSS-REFERENCE TO RELATED APPLICATION

This application is a continuation of prior application Ser. No. 15/222,023, filed Jul. 28, 2016, the disclosure of which is incorporated by reference in its entirety.

FIELD OF THE INVENTION

The present invention relates to optical devices for aligning and correlating the optical emissions of one or more light emitting elements.

BACKGROUND OF THE INVENTION

Light emitting diodes and laser diodes are known to provide improved optical efficiency over conventional forms of lighting. For example, light emitting diodes and laser diodes benefit from a longer life and are in many instances more energy efficient than conventional forms of lighting, for example incandescent lighting.

Despite their advantages, light emitting diodes and laser diodes can provide low uniformity in the output of light. In particular, optical emitters that employ light emitting diodes and laser diodes often lack satisfactory light output uniformity, or may require complex modifications to achieve a satisfactory light output uniformity, particularly where off-axis diodes are used.

It would therefore be beneficial to provide an improved optical emitter which generates a more uniform light distribution across the illuminated area. In particular, it would be beneficial to provide improved control of light uniformity without unduly adding expense or complexity to an optical emitter having one or more off-axis light sources.

SUMMARY OF THE INVENTION

A tractrix-based optical device is provided. The tractrix-based optical device includes a light receiving surface, a light emitting surface, and an intermediate portion of transparent material between the light receiving surface and the light emitting surface. The intermediate portion includes a boundary connective surface that adheres to a tractrix when in cross-section to provide total internal reflection of light propagating from the light receiving surface to the light emitting surface. The tractrix-based optical device can align and correlate light from multiple off-axis light emitting elements, or from an extended source light emitting element, thereby providing a generally uniform output distribution.

In one embodiment, the tractrix-based optical device has a rotational symmetry about its longitudinal axis, being narrower at the light receiving surface than at the light emitting surface. The light receiving surface is optionally a first refractive surface and the light emitting surface is optionally a second refractive surface. Each of the light receiving surface and the light emitting surface can include a conventional refractive or other optically active surface.

In another embodiment, an optical emitter is provided. The optical emitter includes a plurality of light emitting elements and a tractrix-based optical device. The plurality of light emitting elements are offset relative to the longitudinal axis of symmetry of the tractrix-based optical device. Light from the plurality of light emitting elements propagates through the tractrix-based optical device and is combined into a common optical propagation path within the interior of the optical device by total internal reflection of the propagating light. The plurality of light emitting elements are light emitting diodes while in other embodiments the plurality of light emitting elements are laser diodes. In still other embodiments, the optical emitter includes an extended source light emitting element, such that at least a substantial portion of the emitted light is off-axis with respect to the axis of symmetry of the tractrix-based optical device.

The embodiments of the present invention can therefore provide a low-cost, highly-effective tractrix-based optical device and optical emitter to create a common optical propagation path. The tractrix-based optical device can be formed as a single molded component according to inexpensive manufacturing processes with minimal assembly time and cost. The embodiments of the present invention can also provide two or more individual wavelengths from distinct sources with a common optical propagation path or with a desired chromatic hue. Moreover, the optical propagation path of two or more individual light emitting elements can also be optimized to reduce the optical path difference and wave front error to yield a collective uniform color distribution.

These and other advantages and features of the invention will be more fully understood and appreciated by reference to the drawings and the description of the current embodiments.

BRIEF DESCRIPTION OF THE DRAWINGS

This patent or application file contains at least one drawing executed in color. Copies of this patent or application with color drawing(s) will be provided by the Office upon request and payment of the necessary fee.

DESCRIPTION OF THE CURRENT EMBODIMENTS

The invention as disclosed herein includes a tractrix-based optical device for providing total internal reflection of light propagating therethrough. The tractrix-based optical device includes a boundary connective surface that adheres to a tractrix to align and correlate light from multiple off-axis light emitting elements, or from an extended source light emitting element, providing a generally uniform output distribution.

Figure 1:
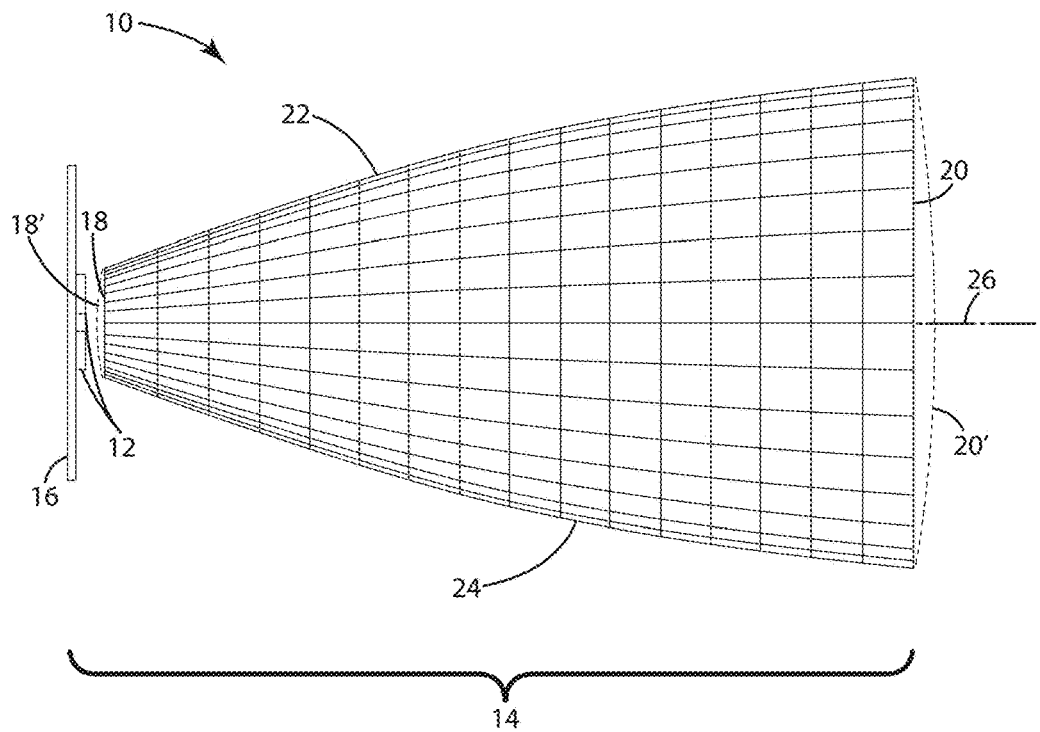
FIG. 1 is a side elevation view of a tractrix-based optical device forming part of an optical emitter including a plurality of light emitting elements.
Figure 2:
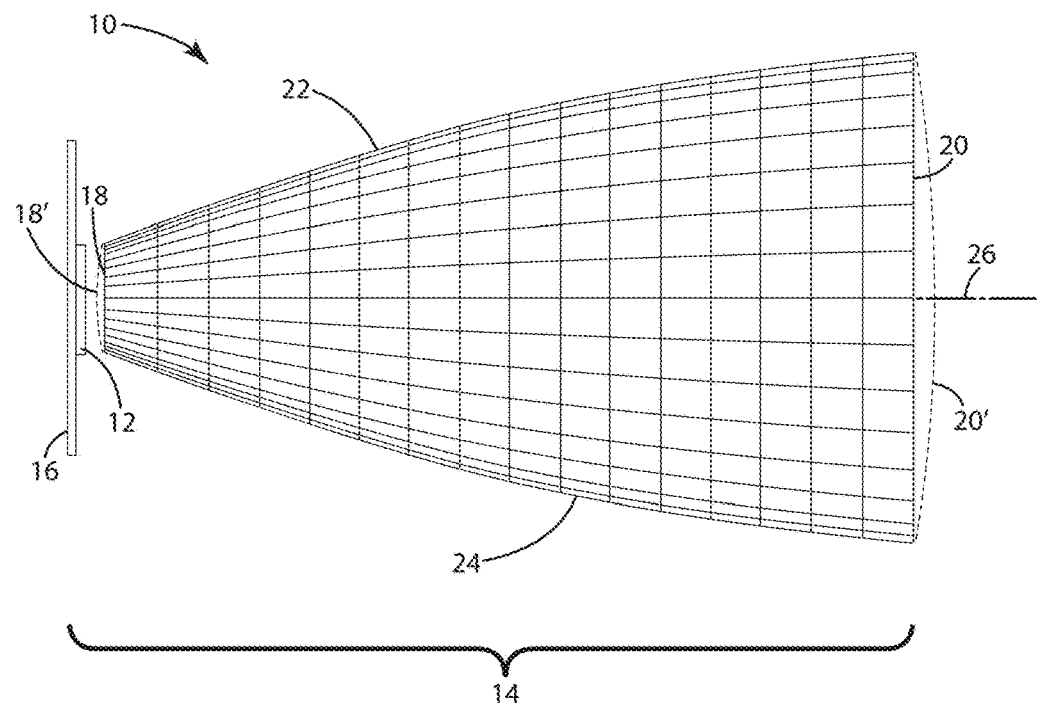
FIG. 2 is a side-elevation view of a tractrix-based optical device forming part of an optical emitter including an extended source light emitting element.
Figure 3:
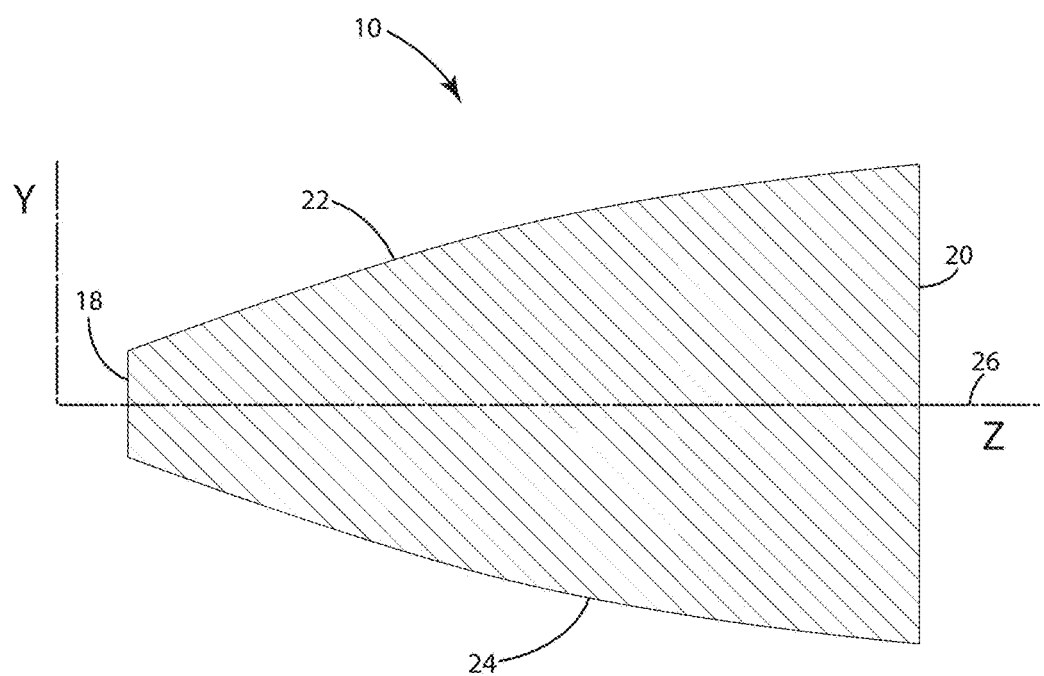
FIG. 3 is a cross-sectional view of the tractrix-based optical device of FIGS. 1 and 2.
Figure 4:
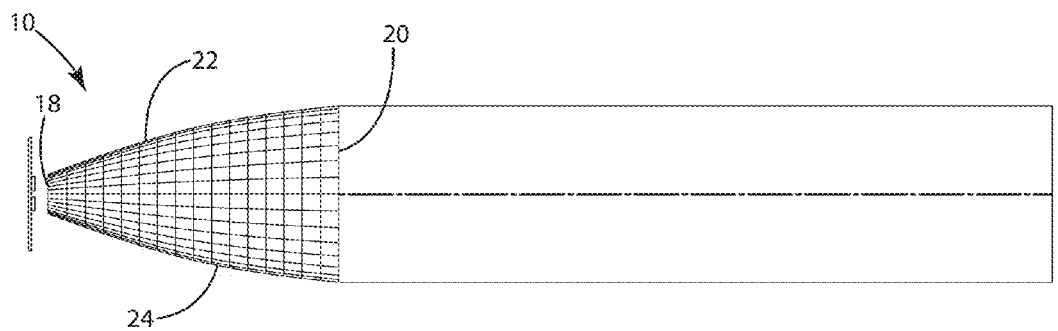
FIG. 4 is a side-elevation view of the tractrix-based optical device of FIG. 1 including an aligned and correlated light output.

A tractrix-based optical device in accordance with one embodiment is depicted in FIG. 1 and generally designated 10. The optical device 10 is illustrated in combination with one or more light emitting elements 12 to form an optical emitter 14. The one or more light emitting elements 12 are light emitting diodes in the present embodiment, but can be laser diodes or other light emitting elements in other embodiments. The light emitting elements 12 are directly or indirectly mounted to a substrate 16, for example a printed circuit board. The light emitting elements 12 emit light upon an electrical current being passed through the light emitting elements 12. Though two light emitting elements 12 are shown, greater or fewer light emitting elements 12 can be used in other embodiments where desired. As shown in FIG. 2, the one or more light emitting elements 12 can also include an extended source light emitting element. As used herein, the term "extended source light emitting element" means any light emitting element(s) that effectively provides an emission area greater than fifty percent of the surface area of the light receiving surface 18.

Referring again to FIG. 1, the tractrix-based optical device 10 is oriented to receive light from the one or more light emitting elements 12. The tractrix-based optical device 10 includes a light receiving surface (or incident surface) 18, a light emitting surface (or exit surface) 20, and an intermediate portion 22 therebetween. The light emitting surface 20 defines a lateral diameter greater than a lateral diameter of the light receiving surface 18. For example, the ratio of the diameter of the light emitting surface 20 to the ratio of the diameter of the light receiving surface 18 is at least 2:1, optionally at least 4:1. The intermediate portion 22 is formed of a transparent material to allow light from the one or more light emitting elements 12 to propagate therethrough. As used herein, a "transparent material" means any material that is fully transparent, semitransparent, or translucent to light emitted by the one or more light emitting elements 12. The transparent material includes a molded optical grade silicone in the present embodiment, but can include other materials in other embodiments where desired. In addition, each of the light receiving surface 18 and the light emitting surface 20 can include a refractive surface or any surface that is shaped to concentrate light rays propagating therethrough. The light receiving surface 18 and the light emitting surface 20 are planar in the illustrated embodiments, but can be convex as shown in phantom as 18' and 20' in FIGS. 1 and 2. These surfaces 18, 20 can be concave in other embodiments where desired.

Referring again to FIG. 1, the light receiving surface 18 is positioned over the one or more light emitting elements 12. Light from the one or more light emitting elements 12 propagates through the light receiving surface 18 towards the light emitting surface 20. The intermediate portion 22 uses total internal reflection (TIR) to transport or guide light from the light receiving surface 16 to the opposite end of the optical device 10, namely the light emitting surface 20. In particular, the intermediate portion 22 includes a boundary connective surface 24. As used herein, the "boundary connective surface" means the outer surface of the intermediate portion 22 that interconnects the light receiving surface 18 and the light emitting surface 20. The boundary connective surface 24 (or a substantial portion thereof, e.g., greater than 50% by length of the optical device 10) adheres to a tractrix when in cross-section and has a rotational symmetry about the optical axis 26 of the optical device 10. The tractrix is defined by the following equation (1), in which "Z" is parallel to the optical axis 24 and "Y" represents the distance from the Z axis:

$$Y=10\times\mathrm{Log}[(10+(10^2-Z^2)^{1/2}/Z)-(10^2-Z^2)^{1/2}] \quad (1)$$

For example, the outer diameter of the intermediate portion 22 adheres to a tractrix when transitioning from the light receiving surface 18 to the light emitting surface 20. The interior of the intermediate portion 22 is entirely occupied by the transparent material, such that the optical device 10 is a unitary volumetric element of dimensional stability.

Figure 5:
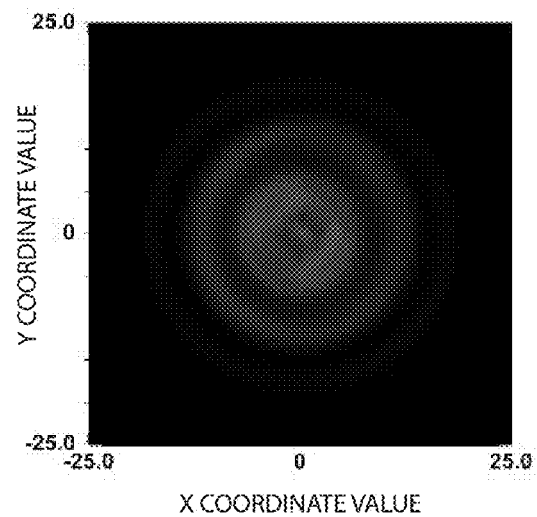
FIG. 5 is a color convergence model for the tractrix-based optical device of FIG. 1.
Figure 6:
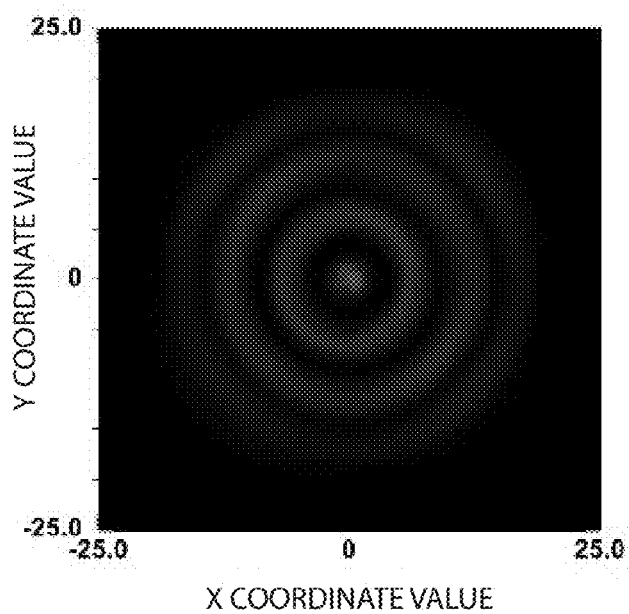
FIG. 6 is a color convergence model for a convergent rod lens.
Figure 7:
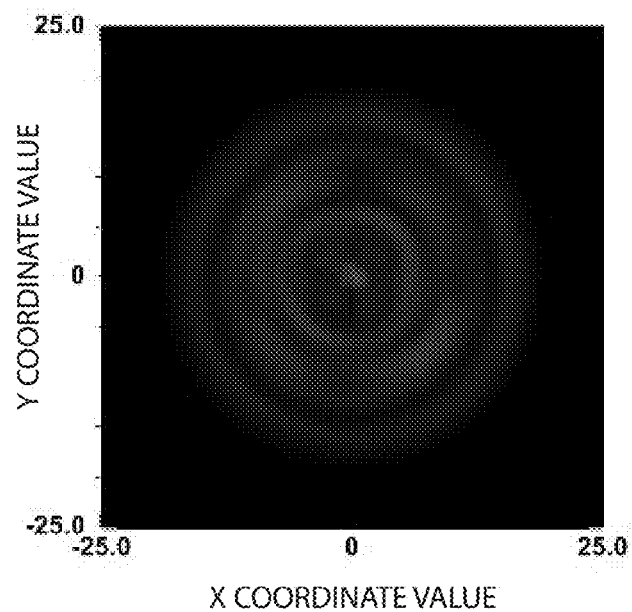
FIG. 7 is a color convergence model for a compound parabolic concentrator.

These and other embodiments can provide a low-cost, highly-effective aligner and correlator for an optical emitter including off-axis light source. The optical device 10 can convert light rays propagating through the optical device into a generally uniform output distribution of light rays, meaning the light intensity output varies across an illuminated area by only several percent. As shown in FIG. 5 for example, the tractrix-based optical device 10 of the present invention provides an improved color convergence over a convergent rod lens (FIG. 6) and a compound parabolic concentrator (FIG. 7). These and other embodiments can provide at least the following advantages. Using the tractrix-based optical device 10, the optical propagation function of two or more off-axis light emitting elements can be designed into a single optical package with a common optical propagation path. Using the tractrix-based optical device 10, the optical propagation function of two or more individual wavelengths of light emanating from distinct sources can be designed into a single optical package with a common optical propagation path. Using the tractrix-based optical device 10, the optical propagation function of two or more individual wavelengths of light emanating from distinct sources can be designed into a single optical package to create a unique chromatic hue. Using the tractrix-based optical device 10, the optical propagation function of two or more individual light emitting elements can be optimized to have a common optical path difference (OPD) and wave front error (WFE) to yield a collective uniform intensity function, where the OPD is the difference in the path length of two optical paths and the WFE is calculated upon the difference between the longest and shortest optical paths. By reducing the OPD and/or the WFE of the emitted light, the spot quality of emitted light can be improved and a more uniform far field light pattern can be provided. Using the tractrix-based optical device 10, different types of extended sources can be combined into a common optical path where individual adjustability may yield a collective uniform intensity function. A unique exit aperture coupling efficiency can be utilized for the light emitting elements, thereby minimizing energy losses.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A optical emitter comprising:
   a plurality of light emitting elements; and
   a tractrix-based optical device consisting of:
      a light receiving surface positioned over the plurality of light emitting elements;
      a light emitting surface spaced apart from the light receiving surface along a common optical axis; and
      an intermediate portion of transparent material interconnecting the light receiving surface and the light emitting surface, wherein the intermediate portion includes a boundary connective surface that follows a tractrix curve from the light receiving surface continuously to the light emitting surface when in cross-section to provide total internal reflection of light propagating from the light receiving surface toward the light emitting surface, wherein light propagating through the tractrix-based optical device from the plurality of light emitting elements is combined into a common optical propagation path, and wherein the tractrix curve is defined with respect to the common optical axis, wherein the tractrix curve is defined by the following equation in which Z is parallel to the common optical axis and Y represents distance from the common optical axis: $Y=10 \times Log[(10+(10^2-Z^2)^{1/2}/Z)-(10^2-Z^2)^{1/2}]$.

2. The optical emitter of claim 1 wherein the light receiving surface is a first refractive surface and wherein the light emitting surface is a second refractive surface.

3. The optical emitter of claim 1 wherein the light emitting surface defines a lateral diameter greater than a lateral diameter of the light receiving surface.

4. The optical emitter of claim 3 wherein the ratio of the lateral diameter of the light emitting surface to the lateral diameter of the light receiving surface is at least 2:1.

5. The optical emitter of claim 1 wherein the plurality of light emitting elements are offset from the common optical axis of the tractrix-based optical device.

6. An optical emitter comprising:
a plurality of light emitting elements; and
a tractrix-based optical device consisting of:
 a light receiving surface positioned over the plurality of light emitting elements,
 a light emitting surface spaced apart from the light receiving surface along a common optical axis, and
 an intermediate portion of transparent material interconnecting the light receiving surface and the light emitting surface of the tractrix-based optical device, wherein the intermediate portion includes a boundary connective surface that follows a tractrix curve from the light receiving surface continuously to the light emitting surface when in cross-section to provide total internal reflection of light propagating from the light receiving surface toward the light emitting surface, wherein light propagating through the tractrix-based optical device from the plurality of light emitting elements is combined into a common optical propagation path, wherein the tractrix curve is defined with respect to the common optical axis by the following equation in which Z is parallel to the common optical axis and Y represents distance from the common optical axis: $Y=10 \times Log[(10+(10^2-Z^2)^{1/2}/Z)-(10^2-Z^2)^{1/2}]$.

7. The optical emitter of claim 6 wherein the plurality of light emitting elements are off-axis with respect to the common optical axis of the light receiving surface and the light emitting surface.

8. The optical emitter of claim 6 wherein the plurality of light emitting elements are light emitting diodes.

9. The optical emitter of claim 6 wherein the plurality of light emitting elements are laser diodes.

10. The optical emitter of claim 6 wherein the tractrix-based optical device provides a generally uniform output distribution of light from the light emitting surface.

11. The optical emitter of claim 6 wherein the light emitting surface defines a lateral diameter greater than a lateral diameter of the light receiving surface.

12. The optical emitter of claim 11 wherein the ratio of the lateral diameter of the light emitting surface to the lateral diameter of the light receiving surface is at least 2:1.

13. An optical emitter comprising:
an extended source light emitting element; and
a tractrix-based optical device consisting of:
 a first refractive surface positioned over the extended source light emitting element,
 a second refractive surface in alignment with the first refractive surface along a common optical axis, and
 an intermediate portion of transparent material interconnecting the first refractive surface and the second refractive surface, wherein the intermediate portion of transparent material includes an outer diameter that follows a tractrix curve from the first refractive surface continuously to the second refractive surface to provide total internal reflection of light propagating through the optical device and to provide light propagating through the optical device with a generally uniform output distribution, wherein the tractrix curve is defined with respect to the common optical axis by the following equation in which Z is parallel to the common optical axis and Y represents distance from the common optical axis: $Y=10 \times Log[(10+(10^2-Z^2)^{1/2}/Z)-(10^2-Z^2)^{1/2}]$.

14. The optical emitter of claim 13 wherein the optical device is a molded element of optical grade material.

15. The optical emitter of claim 13 wherein the ratio of the lateral diameter of the second refractive surface to the lateral diameter of the first refractive surface is at least 2:1.

* * * * *